US006227144B1

(12) United States Patent
Quintero

(10) Patent No.: US 6,227,144 B1
(45) Date of Patent: May 8, 2001

(54) PET BOWL WITH INSECT REPELLENT

(76) Inventor: Edward Quintero, 14828 Seaforth Ave., Norwalk, CA (US) 90650

( * ) Notice: Subject to any disclaimer, the term of this patent is extended or adjusted under 35 U.S.C. 154(b) by 0 days.

(21) Appl. No.: 09/635,028

(22) Filed: Aug. 4, 2000

Related U.S. Application Data

(60) Provisional application No. 60/154,533, filed on Sep. 17, 1999.

(51) Int. Cl.[7] ..................................................... A01K 5/01
(52) U.S. Cl. ................................................................ 119/66
(58) Field of Search .................................. 119/61, 72, 74; 43/108, 114, 116, 120, 121, 132.1, 136

(56) References Cited

U.S. PATENT DOCUMENTS 3,441,003 * 4/1969 Du Mond et al. ...................... 119/61
3,810,446 * 5/1974 Kightlinger et al. ................... 119/61
4,270,490 * 6/1981 Kopp ....................................... 119/61
5,619,952 * 4/1997 Walker ................................... 119/61
5,709,168 * 1/1998 Walker ................................... 119/61

* cited by examiner

Primary Examiner—Thomas Price
(74) Attorney, Agent, or Firm—Goldstein & Canino

(57) ABSTRACT

A pet bowl with insect repellent including a bowl portion having a generally frustoconical configuration. The bowl portion has a narrow upper end and a wide upper end. The narrow upper end has a food holding recess extending downwardly therein. A cover portion is dimensioned for covering the bowl portion while leaving the food holding recess exposed. The cover portion has a generally frustoconical configuration. The cover portion has a narrow open upper end and wide open lower end. The narrow open upper end has an inwardly extending peripheral flange. The peripheral flange rests on the narrow upper end of the bowl portion. A circular poison band is removably positioned around the bowl portion.

5 Claims, 2 Drawing Sheets

PET BOWL WITH INSECT REPELLENT

CROSS REFERENCES AND RELATED SUBJECT MATTER

This application relates to subject matter contained in provisional patent application Ser. No. 60/154,533, filed in the United States Patent & Trademark Office on Sep. 17, 1999.

BACKGROUND OF THE INVENTION

The present invention relates to a pet bowl with insect repellent and more particularly pertains to preventing ants and insects from getting into a pet's food.

When pet owners feed their pets, they normally place the food in a bowl and then place the bowl on the floor to allow the pet access to the food. Most times, pets, such as dogs, devour their food at one time. Some pets, however, do not eat all of their food in one sitting. Thus, the pet will leave the bowl to become involved in some other matter only to return to the bowl at a later time to eat more of their food. A problem exists, especially when the bowl is placed outdoors, with ants and other crawling insects gaining access to the pet's bowl when the pet in not present. Thus, a need exists for a bowl that will prevent ants and other crawling insects from getting into the pet's food.

The present invention attempts to solve the abovementioned problem by providing a bowl that will hold pet food and have a poison band extending around the perimeter which will prevent ants and insects from crawling into the bowl. Additionally, an outer cover will prevent the pet from accidentally licking the poison strip.

The use of pet feeding devices is known in the prior art. More specifically, pet feeding devices heretofore devised and utilized for the purpose of preventing a pet's food from being violated are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,802,302 to Alnafissa discloses a pet food dish with insect trapping means comprised of a replaceable adhesive strip attached around the walls of the base with an annular flange overlying the strip to prevent accidental contact. U.S. Pat. No. 5,619,952 to Walker discloses a pet feeder with a pest barrier comprised of a pad with insect repellent and a moat. U.S. Pat. No. 5,285,749 to Byer discloses an ant proof pet dish supported by pillars.

While these devices fulfill their respective, particular objective and requirements, the aforementioned patents do not describe a pet bowl with insect repellent for preventing ants and insects from getting into a pet's food.

In this respect, the pet bowl with insect repellent according to the present invention substantially departs from the conventional concepts and designs of the prior art, and in doing so provides an apparatus primarily developed for the purpose of preventing ants and insects from getting into a pet's food.

Therefore, it can be appreciated that there exists a continuing need for a new and improved pet bowl with insect repellent which can be used for preventing ants and insects from getting into a pet's food. In this regard, the present invention substantially fulfills this need.

SUMMARY OF THE INVENTION

In the view of the foregoing disadvantages inherent in the known types of pet feeding devices now present in the prior art, the present invention provides an improved pet bowl with insect repellent. As such, the general purpose of the present invention, which will be described subsequently in greater detail, is to provide a new and improved pet bowl with insect repellent and method which has all the advantages of the prior art and none of the disadvantages.

To attain this, the present invention essentially comprises a bowl portion having a generally frustoconical configuration. The bowl portion has a narrow upper end and a wide upper end. The narrow upper end has a food holding recess extending downwardly therein. The bowl portion has a peripheral recess formed therein intermediate the upper and lower ends thereof. The upper end has a plurality of spring biased T-shaped members extending upwardly therefrom in a spaced relationship disposed around the food holding recess. A body of the bowl portion has additional spring biased T-shaped members extending outwardly therefrom around a periphery thereof in a spaced relationship between the peripheral recess and the lower end. A cover portion is dimensioned for covering the bowl portion while leaving the food holding recess exposed. The cover portion has a generally frustoconical configuration. The cover portion has a narrow open upper end and wide open lower end. The narrow open upper end has an inwardly extending peripheral flange. The peripheral flange rests on the spring biased T-shaped members of the upper end of the bowl portion while a peripheral side wall of the cover portion rests on the spring biased T-shaped members of the body of the bowl portion. A circular poison band is removably positioned within the peripheral recess of the bowl portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet bowl with insect repellent which has all the advantages of the prior art pet feeding devices and none of the disadvantages.

It is another object of the present invention to provide a new and improved pet bowl with insect repellent which may be easily and efficiently manufactured and marketed.

It is a further object of the present invention to provide a new and improved pet bowl with insect repellent which is of durable and reliable construction.

An even further object of the present invention is to provide a new and improved pet bowl with insect repellent which is Mr, susceptible of a low cost of manufacture with regard to both materials and labor, and which accordingly is then susceptible of low prices of sale to the consuming public, thereby making such a pet bowl with insect repellent economically available to the buying public.

Even still another object of the present invention is to provide a new and improved pet bowl with insect repellent for preventing ants and insects from getting into a pet's food.

Lastly, it is an object of the present invention to provide a new and improved pet bowl with insect repellent including a bowl portion having a generally frustoconical configuration. The bowl portion has a narrow upper end and a wide upper end. The narrow upper end has a food holding recess extending downwardly therein. A cover portion is dimensioned for covering the bowl portion while leaving the food holding recess exposed. The cover portion has a generally frustoconical configuration. The cover portion has a narrow open upper end and wide open lower end. The narrow open upper end has an inwardly extending peripheral flange. The peripheral flange rests on the narrow upper end of the bowl portion. A circular poison band is removably positioned around the bowl portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
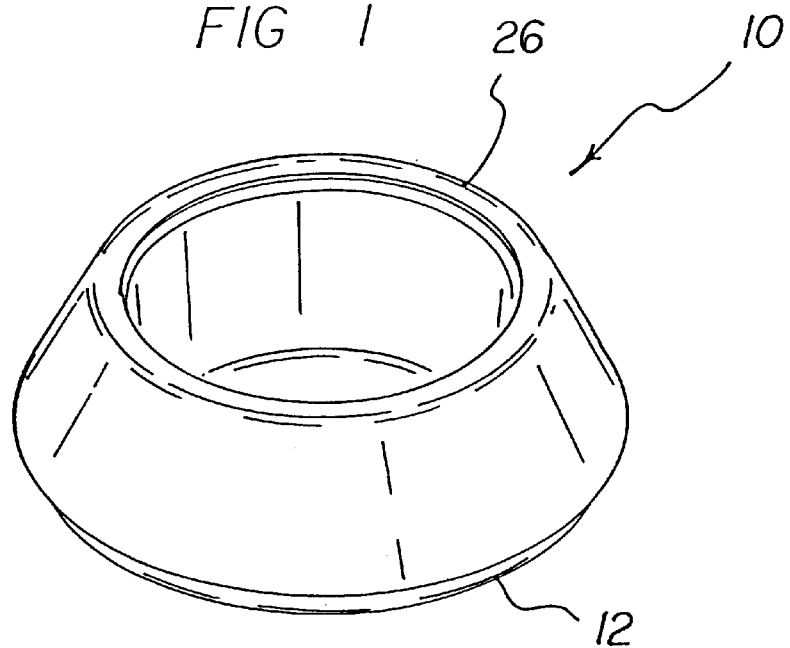
FIG. 1 is a perspective view of the preferred embodiment of the pet bowl with insect repellent constructed in accordance with the principles of the present invention.
Figure 2:
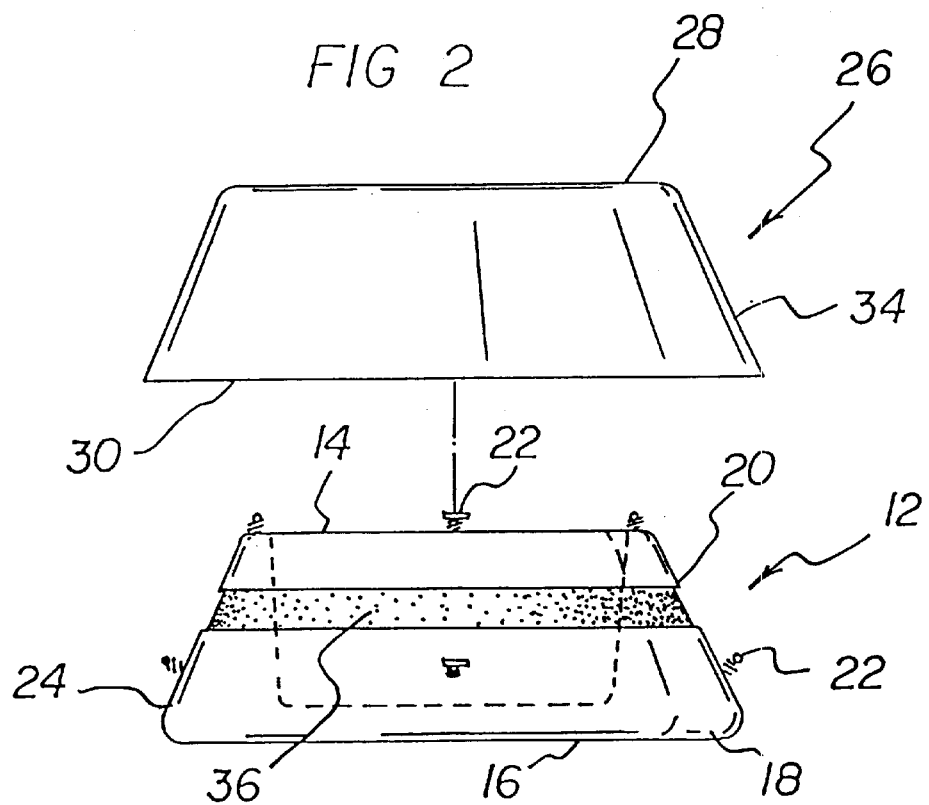
FIG. 2 is an exploded side view of the present invention.
Figure 3:
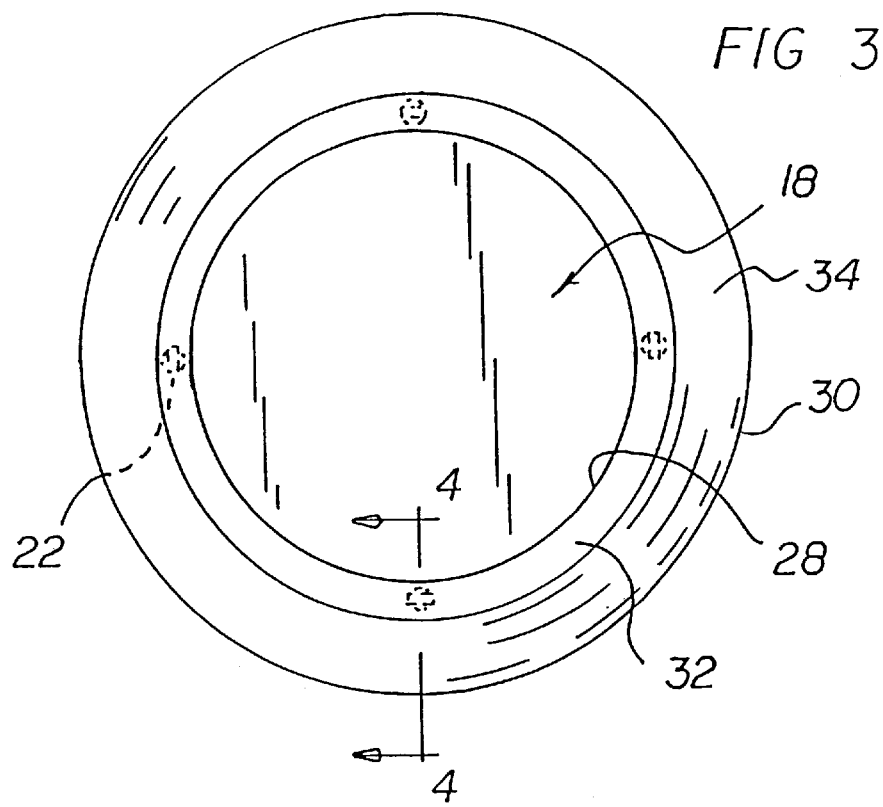
FIG. 3 is a top plan view of the present invention.
Figure 4:
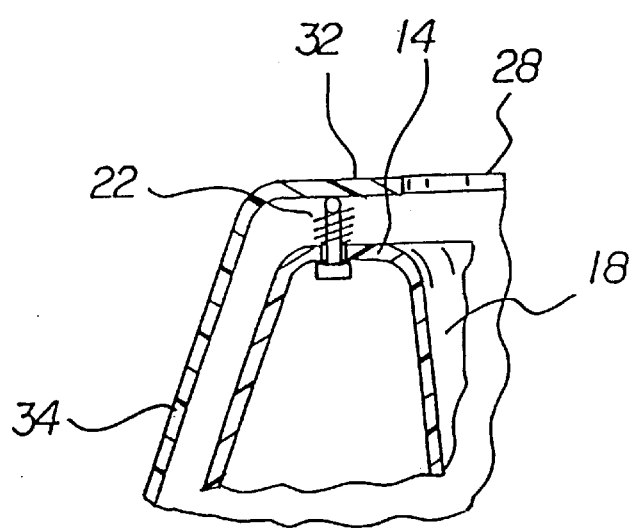
FIG. 4 is a cross-sectional view of the present invention as taken along line 4—4 of FIG. 3.

With reference now to the drawings, and in particular, to FIGS. 1 through 4 thereof, the preferred embodiment of the new and improved pet bowl with insect repellent embodying the principles and concepts of the present invention and generally designated by the reference number 10 will be described.

Specifically, it will be noted in the various Figures that the device relates to a pet bowl with insect repellent for preventing ants and insects from getting into a pet's food. In its broadest context, the device consists of a bowl portion, a cover portion, and a circular poison band. Such components are individually configured and correlated with respect to each other so as to attain the desired objective.

The bowl portion 12 has a generally frustoconical configuration. The bowl portion 12 has a narrow upper end 14 and a wide upper end 16. The narrow upper end 14 has a food holding recess 18 extending downwardly therein. The bowl portion 12 has a peripheral recess 20 formed therein intermediate the upper and lower ends 14,16 thereof. The upper end 14 has a plurality of spring biased T-shaped members 22 extending upwardly therefrom in a spaced relationship disposed around the food holding recess 18. A body 24 of the bowl portion 12 has additional spring biased T-shaped members 22 extending outwardly therefrom around a periphery thereof in a spaced relationship between the peripheral recess 20 and the lower end 16.

The cover portion 26 is dimensioned for covering the bowl portion 12 while leaving the food holding recess 18 exposed. The cover portion 26 has a generally frustoconical configuration. The cover portion 26 has a narrow open upper end 28 and wide open lower end 30. The narrow open upper end 28 has an inwardly extending peripheral flange 32. The peripheral flange 32 rests on the spring biased T-shaped members 22 of the upper end 14 of the bowl portion 12 while a peripheral side wall 34 of the cover portion 26 rests on the spring biased T-shaped members 22 of the body 24 of the bowl portion 12.

The circular poison band 36 is removably positioned within the peripheral recess 20 of the bowl portion 12. The band 36 can be easily replaced as needed. The band 36 will prevent ants and other crawling insects from crawling up the body 24 of the bowl portion 12 and into the food holding recess 18 and the food therein. When the cover portion 26 is in place over the bowl portion 12, it will prevent the pet from making contact with the poison band 36.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pet bowl with insect repellent for preventing ants and insects from getting into a pet's food comprising, in combination:

a bowl portion having a generally frustoconical configuration, the bowl portion having a narrow upper end and a wide upper end, the narrow upper end having a food holding recess extending downwardly therein, the bowl portion having a peripheral recess formed therein intermediate the upper and lower ends thereof, the upper end having a plurality of spring biased T-shaped members extending upwardly therefrom in a spaced relationship disposed around the food holding recess, a body of the bowl portion having additional spring biased T-shaped members extending outwardly therefrom around a periphery thereof in a spaced relationship between the peripheral recess and the lower end;

a cover portion dimensioned for covering the bowl portion while leaving the food holding recess exposed, the cover portion having a generally frustoconical configuration, the cover portion having a narrow open upper end and wide open lower end, the narrow open upper end having an inwardly extending peripheral flange, the peripheral flange resting on the spring biased T-shaped members of the upper end of the bowl portion while a peripheral side wall of the cover portion rests on the spring biased T-shaped members of the body of the bowl portion;

a circular poison band removably positioned within the peripheral recess of the bowl portion.

2. A pet bowl with insect repellent for preventing ants and insects from getting into a pet's food comprising, in combination:

a bowl portion having a generally frustoconical configuration, the bowl portion having a narrow upper end and a wide upper end, the narrow upper end having a food holding recess extending downwardly therein;

a cover portion dimensioned for covering the bowl portion while leaving the food holding recess exposed, the cover portion having a generally frustoconical configuration, the cover portion having a narrow open upper end and wide open lower end, the narrow open upper end having an inwardly extending peripheral flange, the peripheral flange resting on the narrow upper end of the bowl portion;

a circular poison band removably positioned around the bowl portion.

3. The pet bowl with insect repellent as set forth in claim 2 wherein the bowl portion has a peripheral recess formed therein intermediate the upper and lower ends thereof for receiving the circular poison band therein.

4. The pet bowl with insect repellent as set forth in claim 2 wherein the upper end of the bowl portion has a plurality of spring biased T-shaped members extending upwardly therefrom in a spaced relationship disposed around the food holding recess for supporting the narrow open upper end of the cover portion thereon.

5. The pet bowl with insect repellent as set forth in claim 4 wherein a body of the bowl portion has additional spring biased T-shaped members extending outwardly therefrom around a periphery thereof in a spaced relationship for supporting a peripheral side wall of the cover potion.

* * * * *